United States Patent
Tschantz (12)

(10) Patent No.: US 6,540,069 B2
(45) Date of Patent: Apr. 1, 2003

(54) FOLDABLE BELT WITH INTERNAL CABLES

(75) Inventor: Richard W. Tschantz, Louisville, OH (US)

(73) Assignee: Imperial Technologies, Inc, North Canton, OH (US)

(*) Notice: Subject to any disclaimer, the term of this patent is extended or adjusted under 35 U.S.C. 154(b) by 0 days.

(21) Appl. No.: 09/832,698

(22) Filed: Apr. 11, 2001

(65) Prior Publication Data

US 2001/0045344 A1 Nov. 29, 2001

Related U.S. Application Data

(60) Provisional application No. 60/196,688, filed on Apr. 12, 2000.

(51) Int. Cl.[7] .................. B65G 15/30; B65G 17/00; B65G 15/08; B65G 15/40
(52) U.S. Cl. ............... 198/844.1; 198/819; 198/847
(58) Field of Search ................ 198/819, 820, 198/821, 823, 844.1, 847

(56) References Cited

U.S. PATENT DOCUMENTS 4,280,620 A * 7/1981 Baker, Jr. .................. 198/847
4,650,068 A * 3/1987 Vanassche et al. .......... 198/847
4,709,806 A * 12/1987 Candle ...................... 198/819
5,107,983 A * 4/1992 Tschantz ................... 198/819
5,609,242 A * 3/1997 Hutchins et al. ........... 198/847

* cited by examiner

Primary Examiner—Joseph E. Valenza
Assistant Examiner—Gene O. Crawford
(74) Attorney, Agent, or Firm—Sand & Sebolt

(57) ABSTRACT

A flexible endless conveyor belt with fold-over capacity contains support cables longitudinally oriented and internally disposed to the belt. The support cables are distributed throughout the medial portion and the flaps of the belt. In one embodiment of the invention, the hinged areas intermediate the flaps and the medial portion further contain fold cables of a significantly smaller cross-section than those contained in the medial portion and the flaps. In a second embodiment of the invention the hinged areas do not contain fold cables. The first and second embodiments can additionally include transverse cables oriented transversely to the support cables, thus providing third and fourth embodiments of the present invention. The four embodiments can additionally contain grooves in the hinged areas or can contain no grooves, thus providing four additional embodiments.

32 Claims, 8 Drawing Sheets

FIG-14

FOLDABLE BELT WITH INTERNAL CABLES

BACKGROUND OF THE INVENTION

1. Technical Field

The invention relates generally to a flexible endless conveyor belt. More particularly, the invention relates to a flexible endless conveyor belt having steel reinforcing cables. Specifically, the invention relates to a steel reinforced flexible endless conveyor belt having a fold-over capability in which the steel cables themselves are specifically tailored to increase the load-carrying capacity and improve the performance of the belt without interfering with its fold-over function.

2. Background Information

Various forms of belt conveyor systems are known in the art. The general purpose of a belt conveyor system is to move large quantities of materials from one location to another. Such materials are moved for a wide variety of reasons. One type of conveyor system transports materials through a sorting process whereby the materials are incrementally removed from the conveyor at points along its length such that all items are removed from the conveyor at its terminal end. Another type of conveyor system moves materials through a highly controlled process that alters the materials in some fashion. A third type of conveyor system is utilized solely to transport large amounts of material from one location to another.

Improvements in simple load-carrying conveyors have primarily been directed to increasing their load-carrying capacity and velocity. Other improvements have been directed to adapting such systems to carry materials up inclines and down declines such as a coal conveyor used in a subterranean mining location.

One improvement that has resulted in significantly increased carrying capacity and utility of such conveyors has been the creation of conveyor belts with fold-over capacity. In such systems, the belt is formed in a continuous loop with the additional feature that a series of rollers folds the outer edges of the belt over the medial section of the belt. In such systems, the materials are enclosed between the medial portion of the belt and the folded flaps. A second series of roller near the terminal end of the conveyor system returns the flaps to an unfolded position so that the bulk materials can be removed from the conveyor.

Fold-over belts enclose the bulk materials thereby protecting them from spillage and contamination. Such belts additionally allow the bulk materials to be carried over steeper inclines and declines than ordinary open-belt systems. Fold-over belts increase the load-carrying capacity and utility of a belt system while reducing the dust emissions inherent in belt transportation.

Fold-over belts are not, however, without problems. Such systems typically experience significant belt wear both in the flap portions and at the hinge areas, i.e., the areas between the flap portions and the medial portion that bend to create living hinges therebetween. In order to abate some of the wear at the hinge areas, a number of belts known in the art include one or more V-shaped channels formed in these areas on the load-carrying side of the belt to facilitate folding.

Other belts known in the art have included longitudinally oriented cables internally disposed within the belt that carry a portion of the overall belt tension. Such cables have typically been manufactured of steel. The increased tension carrying capacity of such cable-reinforced belts permits the belts to be operated at higher velocities and up and down steeper inclines and declines while correspondingly resulting in greater belt life because the cables carry much of the tensile load on the belts.

The addition of such steel cables, however, has not been without problems. While the addition of steel longitudinal cables in the medial and flap areas of the belt has resulted in improved load-carrying capacity and reduced wear in those areas, the hinge portions of the belt continue to be subject to increased wear. Thus a need exists for an improved fold-over belt having increased load-carrying capacity without the usual high level of wear in the hinged areas.

Moreover, steel cables oriented in the longitudinal direction provide little support in the transverse direction. An unevenly loaded conveyor belt having only longitudinal steel cables will deflect unevenly in the traverse plane in response to disparate loading. The need thus exists for an improved fold-over belt having improved resistance to the uneven deflection typically caused by uneven loading of the belt.

SUMMARY OF THE INVENTION

In light of the foregoing, an objective of the present invention is to provide an improved fold-over belt that experiences less wear and tear in the hinged areas thereof.

Another objective of the present invention is to provide an improved fold-over belt having longitudinal cables therein.

Another objective of the present invention is to provide an improved fold-over belt having transverse cables.

Another objective of the present invention is to provide an improved fold-over belt having a reduced tendency to deflect unevenly in response to uneven loading.

Another objective of the invention is to provide an improved fold-over belt to having reduced strain in the hinged areas.

Another objective is to provide a belt which is of simple construction that achieves the stated objectives in a simple, effective, and inexpensive manner, and that solves problems and satisfies needs existing in the art.

These and other objectives and advantages of the invention are obtained by a flexible endless conveyor belt, the general nature of which may be stated as including a top layer defining a load-carrying surface, a bottom layer defining a driven surface, the driven surface being substantially parallel with the load-carrying surface, the driven surface adapted to being driven and supported by various rollers, the top layer and the bottom layer terminating at a common first edge and a common second edge such that the load-carrying surface, the driven surface, the first edge, and the second edge define a rectangular cross-section of substantially greater width than thickness, a pair of longitudinally-oriented hinged areas, the hinged areas defining a medial portion therebetween and further defining a first flap extending between one of the hinged areas and the first edge and a second flap extending between the other of the hinged areas and the second edge, a plurality of support cables, the support cables longitudinally oriented and disposed within the medial portion and the first and second flaps, and the belt being constructed of a flexible resilient elastomeric material.

BRIEF DESCRIPTION OF THE DRAWINGS

The preferred embodiments of the invention, illustrative of the best mode in which applicant has contemplated applying the principles of the invention, are set forth in the following description and are shown in the drawings and are particularly and distinctly pointed out and set forth in the appended claims.

Similar numerals refer to similar parts throughout the specification.

DESCRIPTION OF THE PREFERRED EMBODIMENTS

Figure 1:
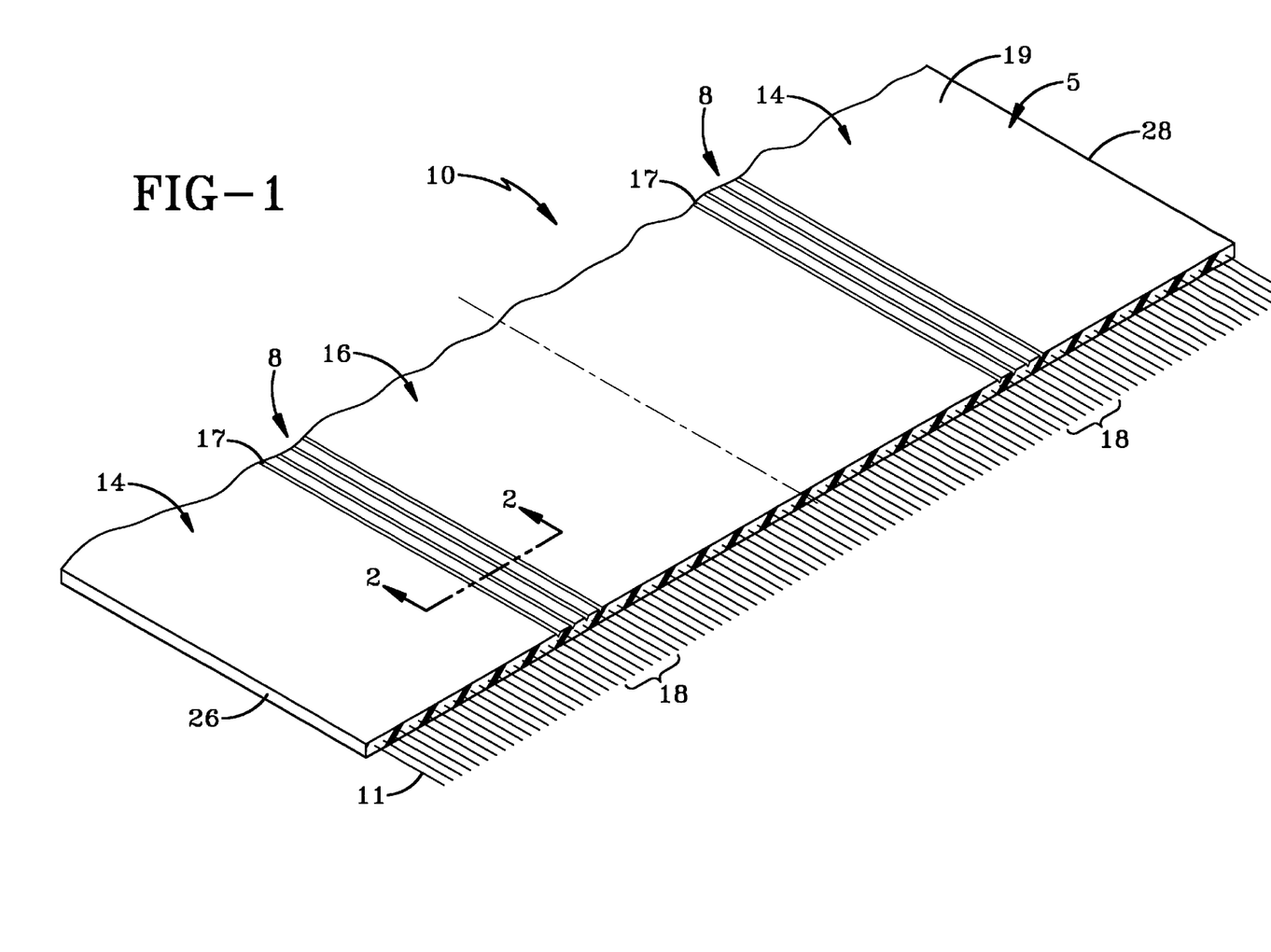
FIG. 1 is a fragmentary perspective view of a portion of the flexible endless conveyor belt of the present invention.
Figure 2:
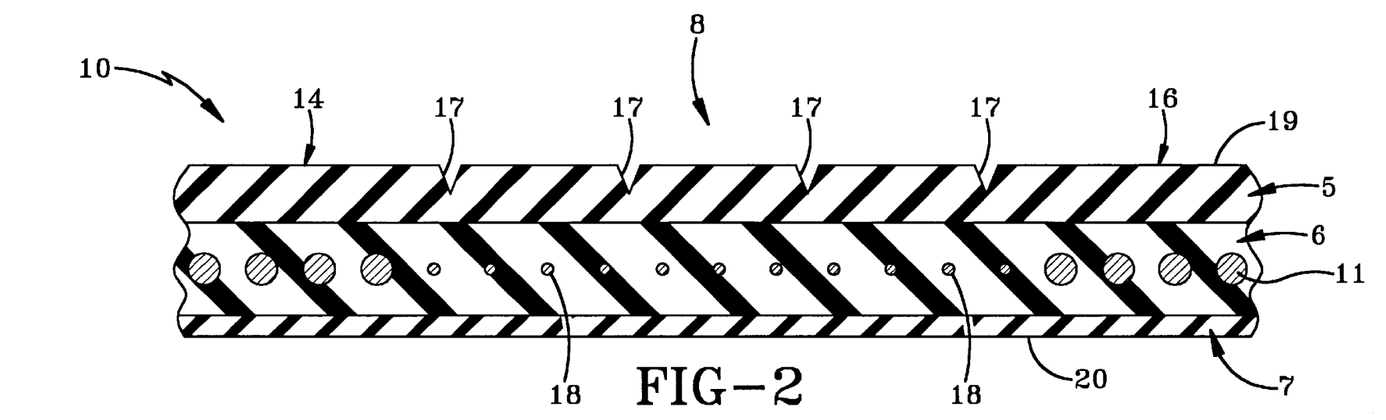
FIG. 2 is a sectional view taken along line 2—2 in FIG. 1, showing a first embodiment of the invention.

The improved flexible endless conveyor belt is indicated generally by the numeral 10 in FIGS. 1 and 2. Belt 10 includes multiple layers of material, and more specifically provides a top layer 5, a bottom layer 7, and an intermediate layer 6 positioned between top layer 5 and bottom layer 7.

Top layer 5 includes a load-carrying surface 19 upon which the bulk material to be transported is carried. As such, top layer 5 is fabricated from a tough flexible material suitable to withstand the repeated loading and unloading of the bulk material on the load-carrying surface. Top layer 5 further includes a pair of hinged areas 8, each of which preferably includes between two and four grooves 17 that preferably are V-shaped or U-shaped in cross-section. Grooves 17 may additionally be of different cross-sections and greater or lesser in number without departing from the spirit of the present invention. Grooves 17 extend substantially downward through top layer 5, but do not extend into intermediate layer 6. Intermediate layer 6 lies between top layer 5 and bottom layer 7 and is constructed of a highly flexible yet resilient material, and further contains cables 11 which run lengthwise through belt 10.

Bottom layer 7 has a driven surface 20 opposed to load carrying surface 19. Driven surface 20 is driven by drive rollers at the ends of the conveyor system and is supported by a plurality of idler rollers 22 at intermediate locations thereof. Bottom layer 7 is thus constructed of a tough, resilient material suited to withstand the stresses incurred in driving belt 10.

Top layer 5 and bottom layer 7 are substantially parallel and spaced apart and each terminate at a common first edge 26 and a common second edge 28 at opposite ends of belt 10. Load carrying surface 19, driven surface 20, and edges 26 and 28 together form the cross-sectional perimeter of belt 10, the width of belt 10 being substantially greater than the thickness. The cross-sectional perimeter is preferably rectangular in cross section, but may be of other configurations without departing from the spirit of the present invention.

Belt 10 includes a medial portion 16 positioned intermediate hinged areas 8 and a pair of flaps 14 positioned outside hinged areas 8 at opposite sides of belt 10. In the present invention, flaps 14 and medial portion 16 are coplanar when in the relaxed position shown in FIG. 2.

Belt 10 also includes a plurality of support cables 11 and a plurality of fold cables 18. Support cables 11 are longitudinally disposed within intermediate layer 6 of medial portion 16 and flaps 14. Fold cables 18 are longitudinally disposed within intermediate layer 6 of hinged areas 8. Support cables 11 and fold cables 18 are preferably of a circular cross section, although other non-circular cross sections may be employed without departing from the spirit of the present invention.

Referring particularly to FIG. 2, and in accordance with one of the main features of the present invention, fold cables 18 are of a smaller cross sectional configuration than support cables 11. More particularly, fold cables 18 are of a smaller diameter than support cables 18 and are positioned within intermediate layer 6 directly beneath hinged areas 8. Support cables 11 and fold cables 18 are preferably constructed of steel fibers, fiberglass, or kevlar, although other materials may be used without departing from the spirit of the present invention. Additionally, support cables 11 in medial portion 16 may have a different diameter then support cables 11 disposed within flaps 14.

Fold cables 18 may have a variety of configurations, but in the preferred embodiment, fold cables 18 have a diameter in approximately the range of 10% to 60% of the diameter of support cables 11. In this manner, support cables 11 carry the majority of the longitudinal stress experienced by belt 10, and fold cables 18, while having a relatively smaller diameter, remain strong in tension yet provide sufficient flexibility to permit hinged areas 8 to open and close without adding undue wear to belt 10. Fold cables 18 and support cables 11 are preferably round in order to eliminate or substantially reduce stress risers resulting from the inclusion of fold cables 18 and support cables 11 within intermediate portion 6 of belt 10. Fold cables 18 and support cables 11 may, however, be of other cross-sectional configurations without departing from the spirit of the present invention.

Figure 4:
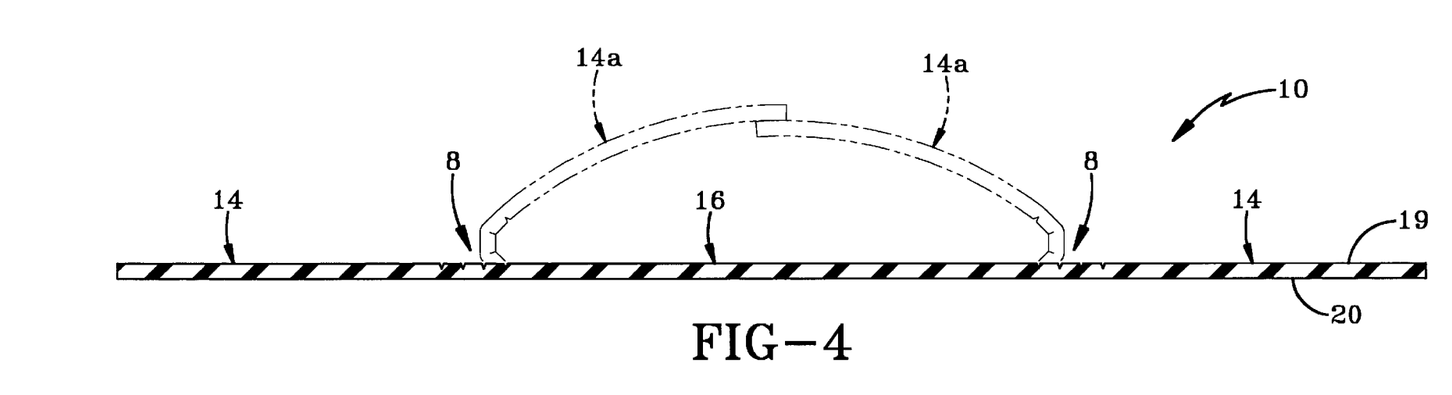
FIG. 4 is a transverse sectional view of a portion of the belt showing in dashed lines the belt in a partially folded position.
Figure 5:
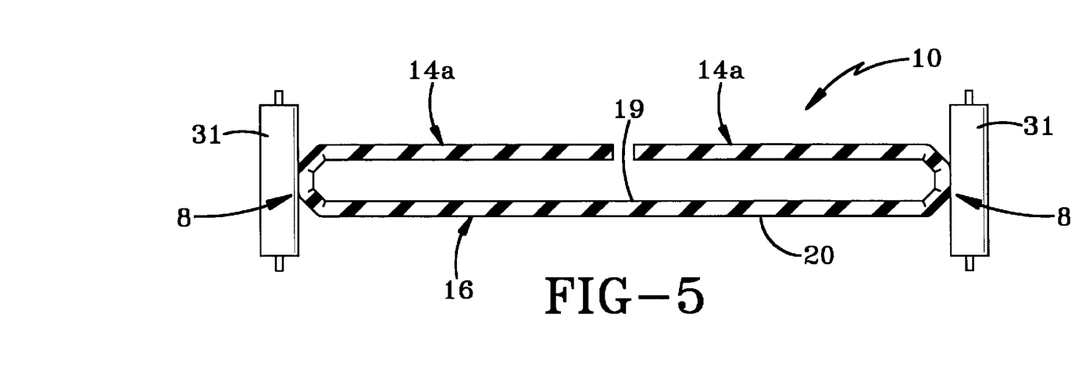
FIG. 5 is a transverse sectional view showing the belt in a folded position.
Figure 6:
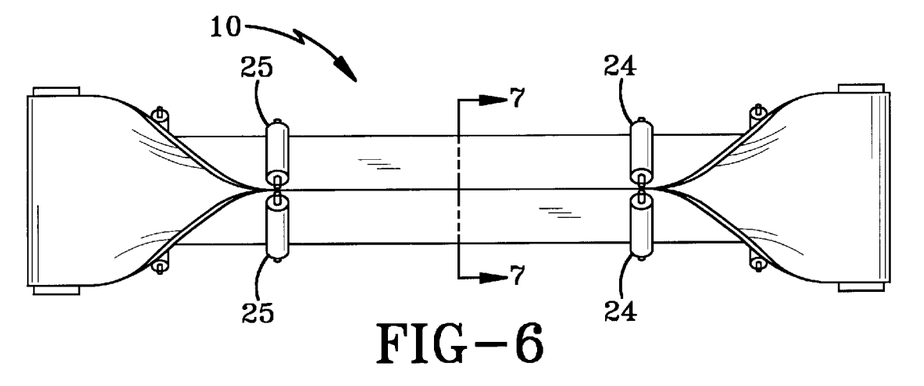
FIG. 6 is a plan view of the invention along with a number of rollers, showing the folding and unfolding operation of the belt.
Figure 7:
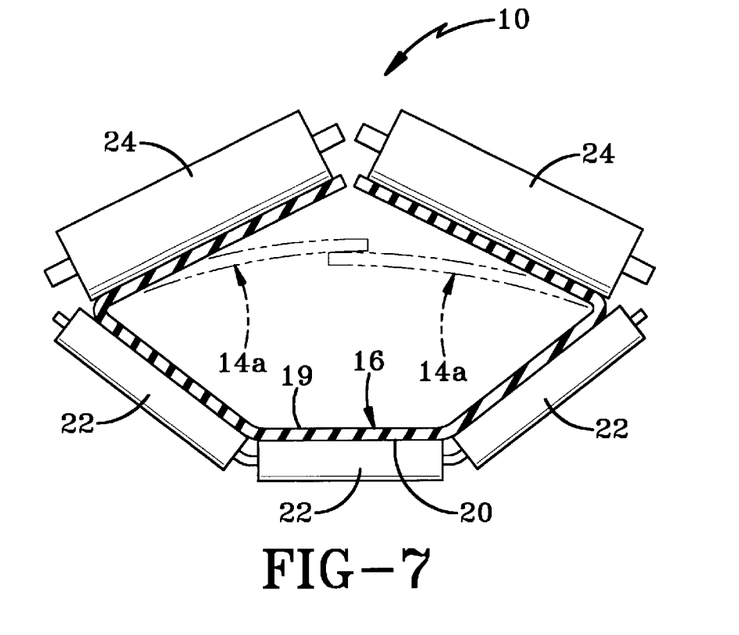
FIG. 7 is a transverse sectional view taken along line 7—7 in FIG. 6 showing the invention in a folded position along with a number of rollers.

When in operation, as shown generally in FIG. 6, the present invention is loaded by placing loose bulk material onto load-carrying surface 19. Flaps 14 are then rotated through an angle up to 180° to a position above medial portion 16 to form a cavity between medial portion 16 and flaps 14 such that the bulk materials are contained within the cavity. Flaps 14 are rotated from the open position to the closed position above medial portion 16 with a set of closing rollers 24. When flaps 14 are in the closed position above medial portion 16, lateral movement of belt 10 can be controlled by a set of outward-lying side rollers 31 applied to hinged areas 8. Flaps 14 are depicted generally by the number 14a when in the folded position, as depicted in FIGS. 4, 5, and 7. Folded flaps 14a are ultimately returned to the flat, unfolded position by a set of opening rollers 25.

Belt 10 is supported in the vertical direction by multiple sets of idler rollers 22 applied to driven surface 20 and located at various points along the length of belt 10. The load-carrying capacity of belt 10 can be increased by orienting idler rollers 22 in such a fashion as to support the medial portion 16 generally in a trough shape, as is shown generally in FIG. 7.

Figure 3:
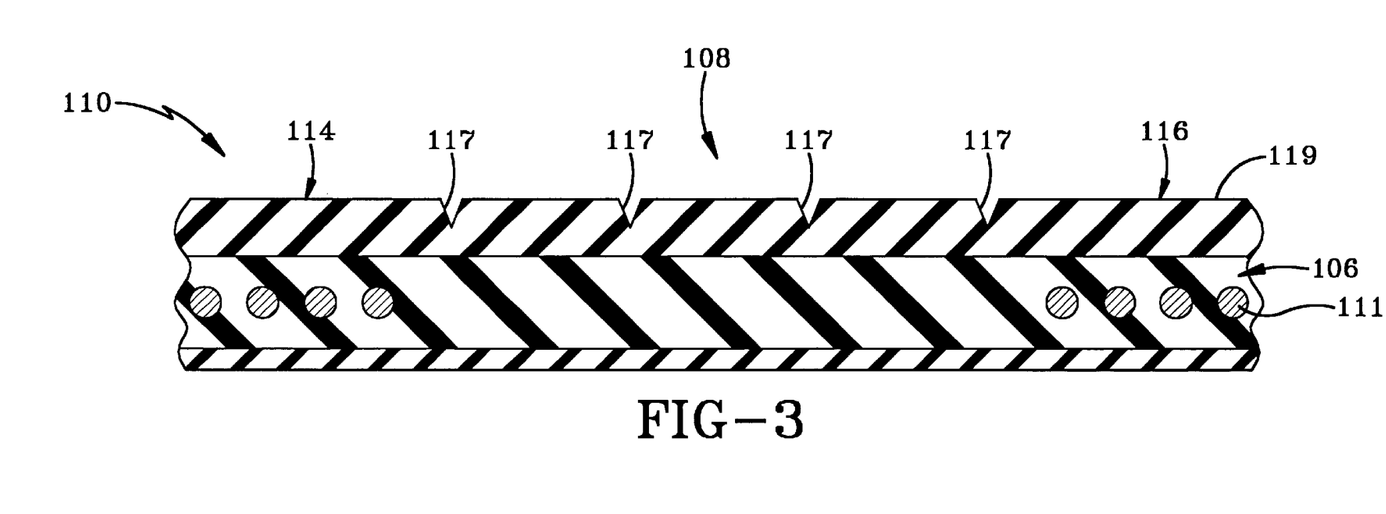
FIG. 3 is a sectional view similar to FIG. 2 showing a second embodiment of the invention.

A second embodiment of the present invention is indicated generally by the numeral 110 in FIG. 3. Belt 110 is different than belt 10 inasmuch as fold cables 18 are absent from belt 110. The absence of fold cables 18 from hinged areas 108 further reduces the stress experienced in hinged areas 108 during the opening and closing operations. Flaps 114 and medial portion 116 have support cables 111 in intermediate layer 106. While hinged areas 108 contain a plurality of grooves 117 formed on load-carrying surface 119, hinged areas 108 contain no fold cables.

Figure 8:
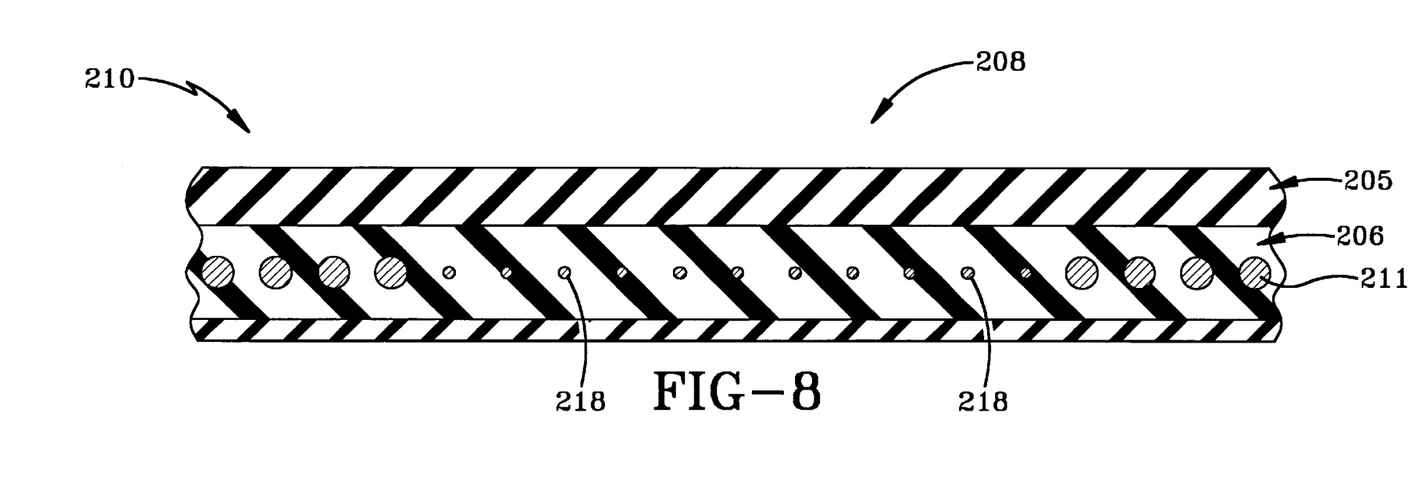
FIG. 8 is a sectional view similar to FIG. 2 showing a third embodiment of the invention.

A third embodiment of the present invention is indicated generally by the number 210 in FIG. 8. Belt 210 is similar to belt 10 except that belt 210 contains no grooves in hinged areas 208. As can be seen in FIG. 8, belt 210 contains support cables 211 and fold cables 218 longitudinally disposed within intermediate layer 206. As is understood in the art, and as depicted in FIG. 2, grooves 17 of belt 10 are formed on top layer 5, thus reducing the thickness of top layer 5 in those areas. Grooves 17 can, therefore, at least nominally reduce the transverse strength of belt 10. The absence of grooves from top layer 205 of belt 210 thus has the effect of increasing the transverse strength of belt 210 as compared with belt 10.

Figure 9:
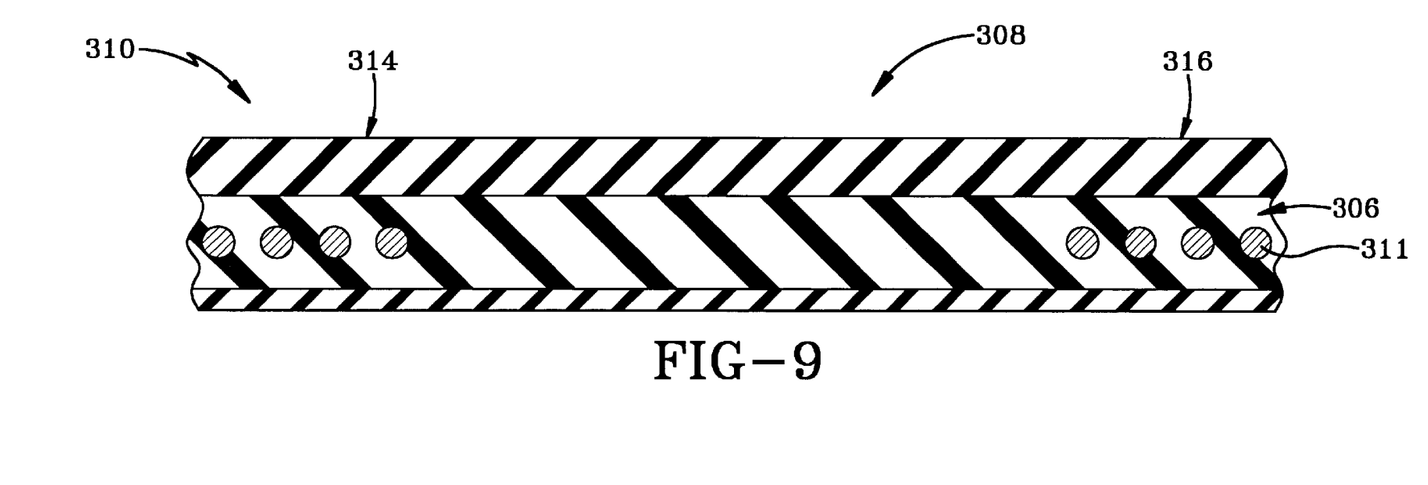
FIG. 9 is a sectional view similar to FIG. 2 showing a fourth embodiment of the invention.

A fourth embodiment of the present invention is indicated generally by the numeral 310 in FIG. 9. Belt 310 is similar to belt 210 except that fold cables 218 that are present in hinged areas 208 of belt 210 are absent from hinged areas 308 of belt 310. Thus, belt 310 contains support cables 311 disposed within intermediate layer 306 of flaps 314 and medial portion 316. Hinges areas 308 contain no cables or grooves.

Figure 10:
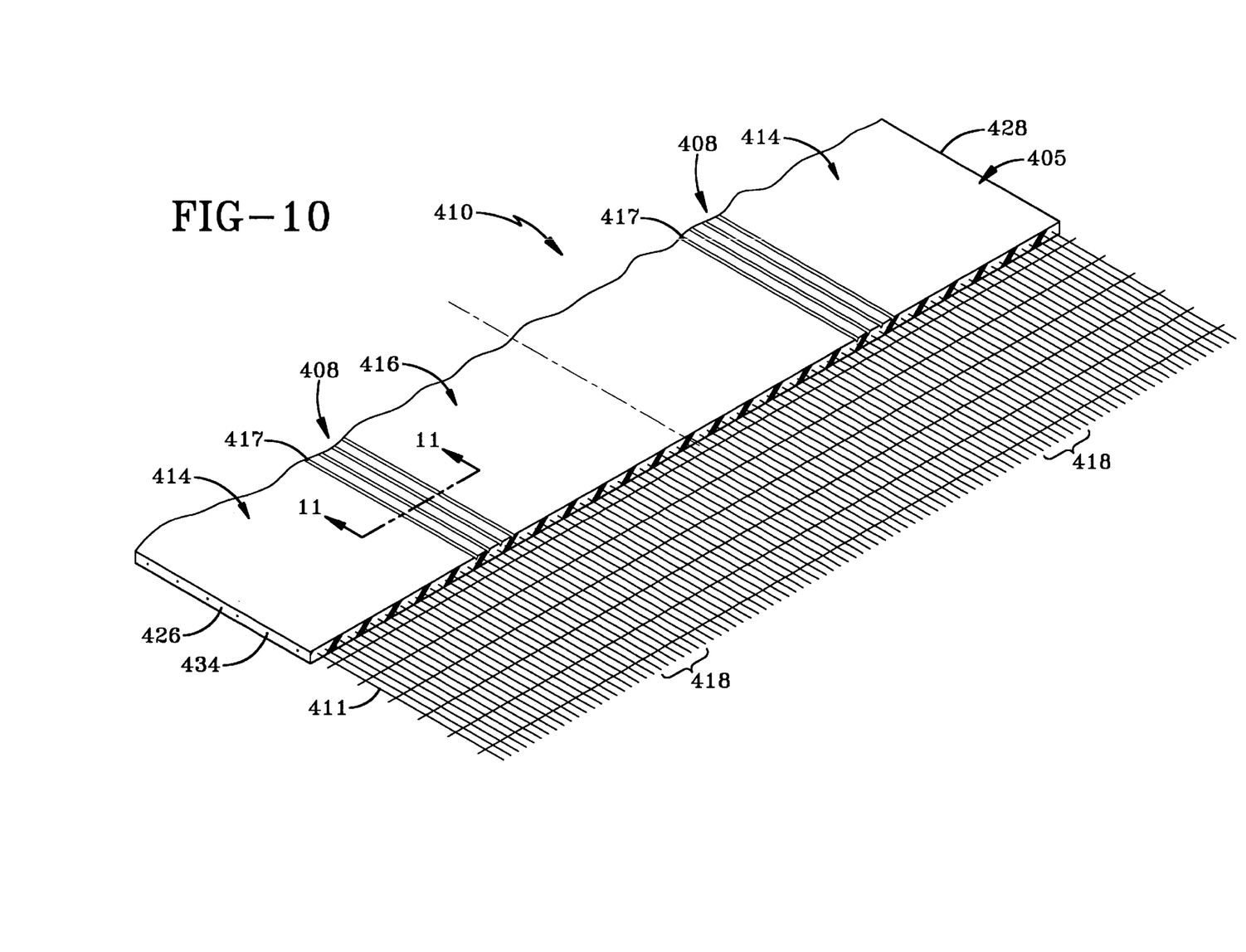
FIG. 10 is a fragmentary perspective view of a fifth embodiment of the flexible endless conveyor belt of the present invention.
Figure 11:
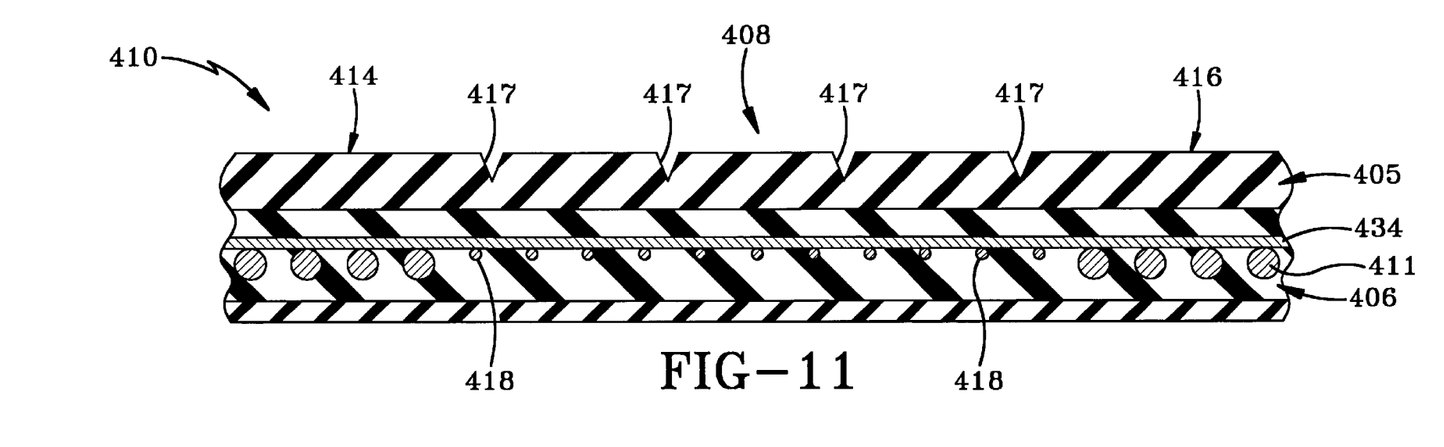
FIG. 11 is a sectional view taken along line 11—11 in FIG. 10 showing the fifth embodiment of the invention.

A fifth embodiment of the present invention is indicated generally by the numeral 410 in FIGS. 10 and 11. As is best shown in FIG. 11, belt 410 is similar to belt 10, except that belt 410 additionally contains a plurality of transverse cables 434 oriented transversely to support cables 411 and fold cables 418. While transverse cables 434 are preferably perpendicularly disposed with respect to support cables 411, transverse cables 434 can be oblique to support cables 411 without departing from the spirit of the present invention. Transverse cables 434 are preferably disposed within intermediate layer 406 and extend the entire width of belt 410 between first edge 426 and second edge 428. Transverse cables 434 are thus disposed within flaps 414, medial portion 416, and hinged areas 408 of belt 410. Belts 434 are preferably of a relatively smaller diameter than support cables 411 and may be of a diameter comparable with fold cables 418 (cables 411 and 418 being sized similar to cables 11 and 18). Transverse cables 434 may, however, be of other diameters without departing from the spirit of the present invention. Belt 410 additionally contains a plurality of grooves 417 formed on top layer 405 to define grooved areas 412.

As discussed above, grooves 417 have the tendency to reduce the transverse strength of belt 410. In accordance with the features of the present invention, cables 434 are oriented in the transverse direction thus increasing the transverse strength of belt 410. Thus, any reduction in transverse strength resulting from the inclusion of grooves 417 is preferably counteracted by the inclusion of cables 434 oriented in the transverse direction.

Figure 12:
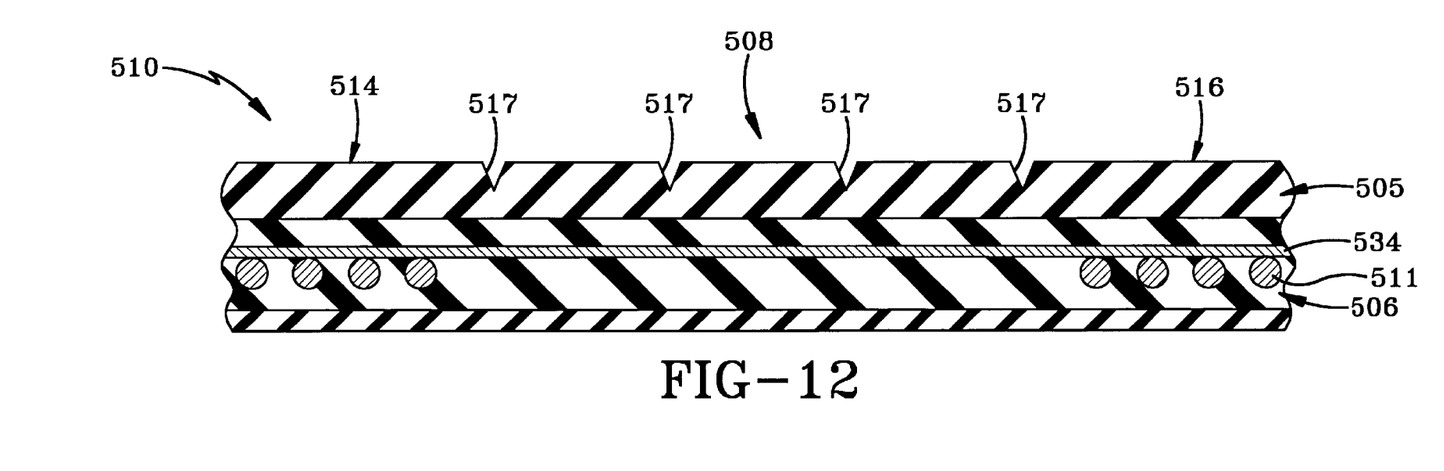
FIG. 12 is a section view similar to FIG. 11 showing a sixth embodiment of the invention.

A sixth embodiment of the present invention is indicated generally by the numeral 510 in FIG. 12. Belt 510 is similar to belt 410 except that fold cables 418 are absent from belt 510. Thus, intermediate layer 506 has longitudinally disposed support cables 511 in flaps 514 and medial portion 516 and further has transverse cables 534 oriented transversely to support cables 511 and extending the entire width of belt 510. A plurality of grooves 517 are formed on top layer 505, but hinged areas 508 have only cables 534 in intermediate layer 506.

Figure 13:
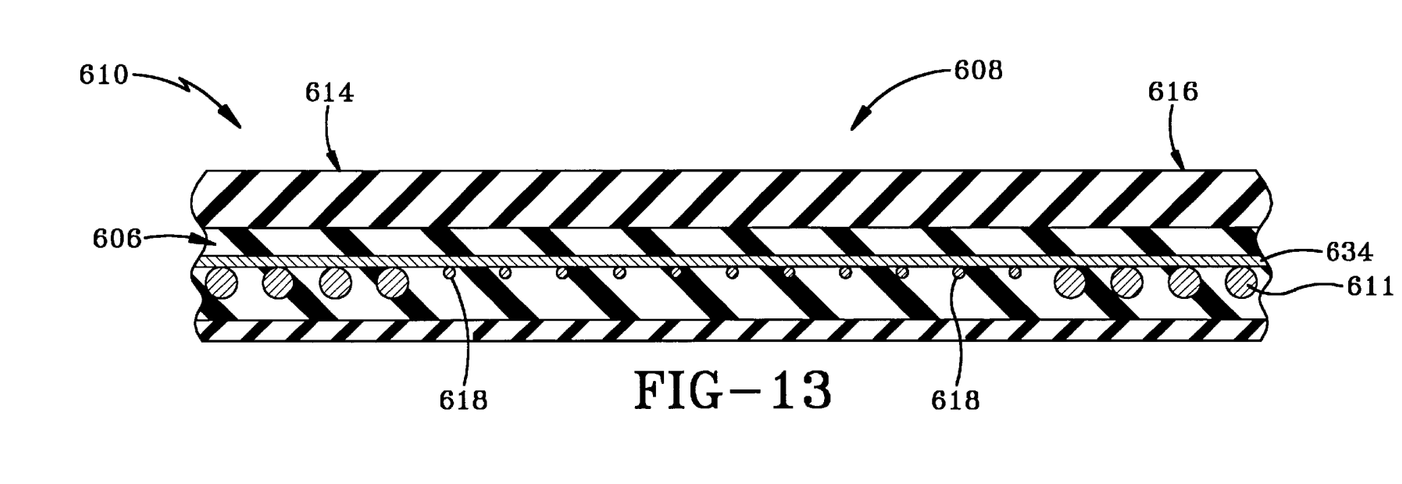
FIG. 13 is a sectional view similar to FIG. 11 showing a seventh embodiment of the invention.

A seventh embodiment of the present invention is indicated generally by the numeral 610 in FIG. 13. Belt 610 is similar to belt 410, except that belt 610 does not contain grooves 417 in hinged areas 608. Intermediate layer 606 has support cables 611 oriented longitudinally within medial portion 616 and flaps 614, and further has fold cables 618 in hinged areas 608. Belt 610 additionally has transverse cables 634 oriented transverse to support cables 611 and fold cables 618 within intermediate layer 606.

Figure 14:
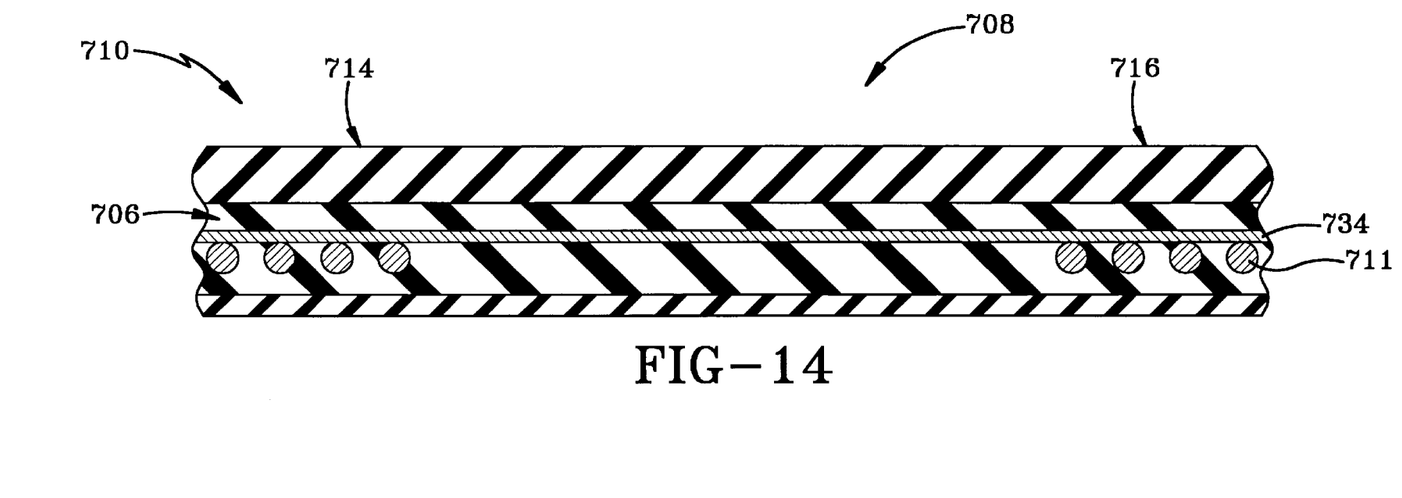
FIG. 14 is a sectional view similar to FIG. 11 showing an eighth embodiment of the invention.

An eighth embodiment of the present invention is indicated generally by the numeral 710 in FIG. 14. Belt 710 is similar to belt 610, except that hinged areas 708 do not contain fold cables 618 in intermediate layer 706. Belt 710 has support cables 711 oriented longitudinally within intermediate layer 706 of flaps 714 and medial portion 716, and further has transverse cables 734 disposed transverse thereto. Hinged areas 708 do not, however, contain fold cables or grooves.

The present invention thus provides a plurality of embodiments suited to various conveyor applications. The applicability of a particular embodiment depends upon the needs for longitudinal strength, transverse strength, and the allowable level of stress in the hinged areas. Inasmuch as the desired characteristics of a belt vary with the geometry of the particular application, it is understood that one or more of the aforementioned embodiments may be equally suitable for any given conveyor application. Additionally, inasmuch as the presence or absence of grooves, support cables, fold cables, and transverse cables directly corresponds with the performance of a particular belt, it is understood that the relative sizes and configurations of these elements can likewise be varied to suit a particular application.

Accordingly, the improved foldable belt with longitudinal cables apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved foldable belt with longitudinal cables is constructed and used, the characteristics of the construction, and the advantageous new and useful results obtained, the new and useful structures, devices, elements, arrangements, parts, and combinations are set forth in the appended claims.

What is claimed is:

1. An endless conveyor belt having a fold-over capacity and adapted to carry a load and be driven by various rollers, said endless conveyor belt comprising:

a load-carrying surface and a driven surface which is substantially parallel with said load-carrying surface, said driven surface adapted to be carried by the various rollers;

said load-carrying surface and said driven surface terminating at a first edge and a second edge, such that said load-carrying surface, said driven surface, said first surface, said first edge, and said second edge define a rectangular cross-sectional of substantially greater width than thickness;

a pair of longitudinally-oriented hinged areas;

said hinged areas defining a medial portion therebetween and further defining a first flap extending between one of said hinged areas and said first edge and a second flap extending between the other of said hinged areas and said second flap; and a plurality of support cables, said support cables longitudinally oriented and disposed within said medial portion and said first and second flaps; and wherein the support cables in said first and second flaps have a first diameter and the support cables in the medial portion have a second diameter, and the first diameter is different to the second diameter.

2. The belt as set forth in claim 1 in which the hinge areas are free of support cables.

3. The belt as set forth in claim 1 further comprising at least one hinge cable extending longitudinally along each hinge area.

4. The belt as set forth in claim 3 in which at least one hinge cable includes a plurality of cables extending along each hinge area.

5. The belt as set forth in claim 4 which the hinge cable has a hinge cable diameter, and in which the diameter of the hinge cable is different from at least one of the first and second diameters of the support cables.

6. The belt as set forth in claim 1 further comprising a top layer defining the load carrying surface, and a bottom layer defining the driven surface, and an intermediate layer positioned between the top layer and the bottom layer.

7. The belt as set forth in claim 6 in which the support cables are disposed within the intermediate layer.

8. The belt as set forth in claim 7 in which the hinge areas include a plurality of cables disposed within the intermediate layer.

9. The belt as set forth in claim 8 in which the cables disposed within the hinge areas are of a different diameter than at least one of the first and second diameters of the support cables.

10. The belt as set forth in claim 9 in which the cables disposed within the hinge areas have a smaller diameter than at least one of the first and second diameters of the support cables.

11. The belt as set forth in claim 1 further comprising at least one groove formed in each hinge area.

12. The belt as set forth in claim 11 in which the grooves are formed in the load-carrying surface.

13. The belt as set forth in claim 12 comprising a plurality of grooves formed in the load-carrying surface of the belt within each hinge area.

14. The belt as set forth in claim 13 in which the hinge areas are free of support cables.

15. The belt as set forth in claim 13 comprising at least one hinge cable extending longitudinally along each hinge area.

16. The belt as set forth in claim 15 in which at least one hinge cable includes a plurality of cables extending along each hinge area.

17. The belt as set forth in claim 12 further comprising a top layer defining the load carrying surface, and a bottom layer defining the driven surface, and an intermediate layer positioned between the top layer and the bottom layer.

18. The belt as set forth in claim 17 which the support cables are disposed within the intermediate layer.

19. The belt as set forth in claim 18 in which the hinge areas include a plurality of cables disposed within the intermediate layer.

20. The belt as set forth in claim 19 in which the cables disposed within the hinge areas are of a different diameter then the support cables.

21. The belt as set forth in claim 1 further comprising at least one transverse support cable extending transverse to the longitudinal direction of the belt.

22. The belt as set forth in claim 21 comprising a plurality of grooves formed in the load-carrying surface of the belt within each hinge area.

23. The belt as set forth in claim 21, wherein the transverse support cable is not connected to the support cables in either said medial portion or said first and second flaps of the belt.

24. The belt as set forth in claim 21 in which the hinge areas are free of support cables.

25. The belt as set forth in claim 21 in which a plurality of cables extend transverse to the longitudinal direction of the belt.

26. The belt as set forth in claim 21 further comprising at least one hinge cable extending longitudinally along each hinge area.

27. The belt as set forth in claim 26 in which at least one hinge cable includes a plurality of cables extending along each hinge area.

28. The belt as in claim 27 in which the hinge cable has a hinge cable diameter, and in which the diameter of the hinge cable is different from at least one of the first and second diameters of the support cables.

29. The belt as set forth in claim 21 further comprising a top layer defining the load carrying surface, and a bottom layer defining the driven surface, and an intermediate layer positioned between the top layer and the bottom layer.

30. The belt as set forth in claim 29 which the support cables are disposed within the intermediate layer.

31. The belt as set forth in claim 30 in which the hinge areas include a plurality of cables disposed within the intermediate layer.

32. The belt as set forth in claim 31 in which the cables disposed within the hinge areas are of a different diameter than at least one of the first and second diameters of the support cables.

* * * * *